United States Patent
Zwick et al.

(10) Patent No.: US 8,884,811 B2
(45) Date of Patent: Nov. 11, 2014

(54) METHOD FOR SEPARATING TRANSMITTED SIGNALS IN A RADAR SYSTEM

(75) Inventors: Thomas Zwick, Graben-Neudorf (DE); Christian Sturm, Bietigheim-Bissingen (DE)

(73) Assignee: Karlsruher Institut fur Technologie, Karlsruhe (DE)

( * ) Notice: Subject to any disclaimer, the term of this patent is extended or adjusted under 35 U.S.C. 154(b) by 459 days.

(21) Appl. No.: 13/361,038

(22) Filed: Jan. 30, 2012

(65) Prior Publication Data

US 2013/0342387 A1    Dec. 26, 2013

(30) Foreign Application Priority Data

Jan. 31, 2011   (DE) .......................... 10 2011 009 874

(51) Int. Cl.
*G01S 13/00*    (2006.01)
*G01S 13/32*    (2006.01)

(52) U.S. Cl.
CPC ............ *G01S 13/003* (2013.01); *G01S 13/325* (2013.01)
USPC .............................. 342/59; 342/159; 342/202

(58) Field of Classification Search
CPC ....... G01S 13/87; G01S 13/003; G01S 13/08; G01S 13/76; G01S 2013/466; H04B 1/7183
USPC ........................................... 342/59, 159, 202
See application file for complete search history.

(56) References Cited

U.S. PATENT DOCUMENTS

| | | | |
|---|---|---|---|
| 5,448,243 A * | 9/1995 | Bethke et al. | 342/59 |
| 6,392,588 B1 * | 5/2002 | Levanon | 342/202 |
| 6,867,727 B1 * | 3/2005 | Mitra | 342/59 |
| 6,977,610 B2 * | 12/2005 | Brookner et al. | 342/59 |
| 8,154,411 B2 * | 4/2012 | Richards et al. | 340/573.1 |
| 8,441,393 B2 * | 5/2013 | Strauch et al. | 342/60 |
| 2010/0156701 A1 * | 6/2010 | Shirakawa | 342/118 |
| 2010/0164784 A1 | 7/2010 | Longstaff | 342/202 |
| 2011/0080264 A1 * | 4/2011 | Clare et al. | 340/10.1 |
| 2011/0279305 A1 | 11/2011 | Lellouch et al. | 342/107 |
| 2012/0019407 A1 | 1/2012 | Lesturgie | 342/36 |
| 2013/0113644 A1 * | 5/2013 | Nakagawa et al. | 342/6 |
| 2013/0342387 A1 * | 12/2013 | Zwick et al. | 342/202 |

OTHER PUBLICATIONS

*A Novel OFDM Waveform for Fully Polarimetric SAR Data Acquisition*; Kim et al.; 8th European Conference on Synthetic Aperture Radar, Jun. 9, 2010, Aachen, Germany; pp. 410-413; (ISBN: 978-3-80-073272-2).

(Continued)

*Primary Examiner* — John B Sotomayor
(74) *Attorney, Agent, or Firm* — Renner Kenner Greive Bobak Taylor & Weber

(57) ABSTRACT

The present invention relates to a method for separating transmitted signals in radar systems and an associated radar system. In the method, the signals for transmission are shared among multiple subcarriers by means of OFDM, which subcarriers are assigned to the transmitting antennas according to a distribution scheme. In this distribution scheme, each subcarrier is assigned to one transmitting antennas only. The subcarriers assigned to a given transmitting antenna are spread over the entire signal bandwidth. In this way, very high dynamics may be achieved while retaining complete orthogonality of the signal paths.

9 Claims, 3 Drawing Sheets

(56) References Cited

OTHER PUBLICATIONS

*The Parameter Setting Problem of Signal OFDM-LFM for MIMO Radar*; Fang et al.; International Conference on Communications, Circuits and Systems, May 25, 2008, Piscataway, NJ, U.S.A.; ,pp. 876-880; (ISBN: 978-1-4244-2063-6).

European Search Report mailed May 7, 2012 in corresponding application No. 120004478.

*Combining MIMO Radar with OFDM Communications*; Donnet et al.; Radar Conference, 2006; EuRAD 2006; $3^{rd}$ European, Sep. 13-15, 2006; pp. 37-40; (ISBN: 2-9600551-7-9).

* cited by examiner

Time index (OFDM symbols)

| Subcarrier | 1 | 2 | 3 | 4 | 5 | |
|---|---|---|---|---|---|---|
| 1 | 1 | 2 | 3 | 1 | 2 | .... |
| 2 | 2 | 3 | 1 | 2 | 3 | .... |
| 3 | 3 | 1 | 2 | 3 | 1 | .... |
| 4 | 1 | 2 | 3 | 1 | 2 | .... |
| 5 | 2 | 3 | 1 | 2 | 3 | .... |
| 6 | 3 | 1 | 2 | 3 | 1 | .... |
| 7 | 1 | 2 | 3 | 1 | 2 | .... |

Fig. 4

METHOD FOR SEPARATING TRANSMITTED SIGNALS IN A RADAR SYSTEM

CROSS-REFERENCE TO RELATED APPLICATION

This application claims priority of German patent application number DE 10 2011 009 874.7 filed Jan. 31, 2011, and which is incorporated herein by reference.

TECHNICAL FIELD

The present invention relates to a method for separating transmitted signals in a radar system that includes multiple transmitting antennas with individual transmitted signals and one or more receiving antennas for radar signals, in which the radar signals are transmitted via the individual transmitting antennas in such manner that the received radar signals can be assigned to the transmitting antennas by which they were transmitted. The invention further relates to a radar system comprising one or more transmitting devices and receiving devices for radar signals which are designed for the purpose of carrying out the method.

It is necessary to separate user or transmitted signals in radar systems if multiple radar transmitters are to be active within a small distance from each other and in the same frequency range. This is the case for example in multiple-in-multiple-out (MIMO) radar systems or sensor networks. In MIMO radar systems, multiple transmitters and receivers are used simultaneously on a single platform so that extended information can be acquired instantaneously, such as 3D geometry via an observed scenario. Subsequently, it must be possible to separate the signals transmitted by the various transmitters uniquely at the receivers. In sensor networks, identical or similar sensors are typically used on different platforms within a small area. If the system is to function properly, the transmitted signals associated with the individual transmitters and sensors must not interfere with each other.

RELATED ART

When multiple transmitters or transmitting antennas are present, the signals are typically separated either by time-division multiplexing or by code-division multiplexing. However, both methods are associated with critical drawbacks.

In the case of time-division multiplexing, only one transmitter can ever be active at a given time. For the purposes of a MIMO radar, this means that moving objects cannot be measured, since the observed scenario would change between the activity of the individual transmitters. For sensor networks in this case too, there are serious limitations in terms of the temporal availability of the individual sensors. It is fundamentally not possible to achieve the maximum possible signal-to-noise ratio (SNR) using time-division multiplexing for either of these two applications.

When transmitted signals are separated using code-division multiplexing, the transmitted signals are encoded orthogonally with the aid of suitable codes. With this coding, the received radar signals can be assigned to the transmitting antennas by which they were transmitted. In this case, however, it must be noted that a pulse response must be determined for each signal path so that the distance profile can be measured. This is usually provided by correlating the transmitted signals with the received signals. In this context, the quality of the result depends on the autocorrelation function of the transmitted signal.

Possible sidelobes of the autocorrelation function are mapped directly to the radar measurement and define the limits of the dynamics. Accordingly, code-based separation of the transmitted signals is subject to two requirements: all transmitted signals must be orthogonal and at the same time the sidelobes of the autocorrelation function must be small. It can be shown theoretically that these two conditions are mutually exclusive, and that there is no coding that combines these two properties perfectly. Instead, there is a common limit for the sidelobes of the autocorrelation function and for the orthogonality (the Welch bound) that the signal cannot fall below. In practice, this means that radar systems that work on the basis of encoding transmitted signals in order to separate the signals have not only limited pulse response dynamics but also crosstalk between the transmitted signals.

In communications technology, frequency-division multiplexing is often used to separate users, in which case a narrow portion of the total available bandwidth is assigned to each user. However, this is not possible in the case of radar applications without causing a significant deterioration in output, since the radar's resolution depends on the signal bandwidth that is being used in each case.

The object of the present invention is to suggest a method for separating transmitted signals in a radar system and an associated radar system with which very high dynamics and at the same time total orthogonality of the signal paths may be achieved in radar applications.

SUMMARY OF THE INVENTION

This object is achieved with the method and the radar system as recited in claims 1 and 5 respectively. Advantageous configurations of the method and of the radar system are subject of the dependent claims or may be deduced from the following description and embodiment.

In the suggested method for separating transmitted signals in a radar system that includes multiple transmitting antennas with individual transmitted signals and one or more receiving antennas for radar signals, the radar signals are transmitted via the individual transmitting antennas with a signal bandwidth such that received radar signals may be assigned to the transmitting antennas by which they were transmitted. For the purposes of the present patent application, a radar system is understood also to refer to a radar or sensor network in which one or more transmitting antennas are arranged on spatially separate platforms. The method is characterized in that the transmitted signals are divided among multiple subcarriers by orthogonal frequency division multiplexing (OFDM), which subcarriers are assigned to the transmitting antennas in accordance with a distribution scheme. In this distribution scheme, each subcarrier is only assigned to one transmitting antenna, and for each transmitting antenna the subcarriers assigned to this transmitting antenna are spread over the entire signal bandwidth.

In this method for separating transmitted signals, an inherent orthogonality of the transmitted signals is thus achieved by a special design of the multicarrier signals, based on the OFDM method. In a classic OFDM system, such as is known for both communications and radar applications, each of which with one transmitter, a large number of sinusoidal phase-modulated subcarriers is broadcast simultaneously. By selecting the distance between the subcarriers in the frequency range as equal to the inverse of the symbol duration, these subcarriers are orthogonal. The subcarriers may thus be separated completely in the receiver, even though they overlap in the spectral range. In a classic OFDM transmission of such kind, typically all subcarriers are used, since this is the way to achieve the greatest possible spectral efficiency.

In contrast to the above, the present invention exploits the fact that for multicarrier radar applications it is not the spectral efficiency that is decisive for determining output but rather the resolution and the signal-to-noise ratio. The resolution is determined solely by the signal bandwidth. In this context, it was realised that not all of the subcarriers have to be occupied in order to use the signal bandwidth to advantage. At the same time, in a multicarrier radar application the signal-to-noise ratio at the receiver with constant transmitting power is not affected by the number of subcarriers used, since the changed noise output and the changed processing gain cancel each other out exactly. For this reason, a multicarrier radar application in which only a limited number of subcarriers are actually used within the transmitted signal has the same output capability as a system that uses all of the subcarriers. The subcarriers for each transmitting antenna must only be distributed across the entire signal bandwidth, or at least close to the entire signal bandwidth. This is achieved in the method according to the invention by the distribution scheme. In this context, the individual K sub carriers may be interlaced in any scheme and assigned to the M transmitting antennas, so that each subcarrier is transmitted only by exactly one transmitting antenna. In this way, the signals broadcast by the individual antennas are orthogonal and they may be separated completely at the receivers or receiving antennas, and assigned to the respective transmitters or transmitting antennas. Orthogonality is achieved perfectly particularly if all of the transmitters or transmitting antennas are actuated by a common phase reference. In this case, interlaced allocation is understood to mean that the total number of subcarriers assigned to a transmitting antenna is distributed over the entire signal bandwidth, or at least almost the entire signal bandwidth. In this way, the high resolution of the radar application determined by the signal bandwidth is not compromised.

In such a case, an exemplary distribution scheme may be organised such that for M transmitting antennas and K subcarriers, wherein K>>M, subcarriers I, I+M, I+2M and so on are routed to transmitting antenna I, wherein I 1, 2 . . . M. Since OFDM systems work with a very large number K of subcarriers, for example 1024 subcarriers, such a distribution causes practically no reduction in the total bandwidth of the individual transmitted signals. Of course it is also possible to design more complex distribution patterns.

In radar applications using the suggested method and the associated radar system, the distance as well as any additional relative velocity of objects may be determined in each signal path either in known manner with suitable encoding of the transmitted signals or using a modulation symbol-based processing method, such as is described in DE 10 2009 019 905 A1. With the usual determination of distance using suitable encoding of transmitted signals, this encoding may be optimised to minimal sidelobes in the autocorrelation function, since such codes no longer have to be orthogonal with the present method. If the described modulation symbol-based processing method is used, the modulation symbols are first extracted from the received aggregate signal at each receiver, and then they are assigned to the corresponding signal paths. A common distance and Doppler profile is then processed from the associated modulation symbols for each signal path individually. In this case, carriers that are not present are simply assigned a value of 0. When this modulation symbol-based method is used in conjunction with the suggested transmission signal separation, the sidelobes may be reduced to a level as low as desired. In this way, any useful information may be modulated to the subcarriers even in parallel.

In the case of the modulation symbol-based method, the maximum measurable distance is reduced if the subcarriers are not fully occupied. This effect may be avoided if the suggested method is extended by permutating the assignment of the subcarriers to the transmitting antennas cyclically, so that each subcarrier has been transmitted by each antenna after a specified number of time steps.

The suggested radar system includes at least one transmitting device for radar signals, a plurality of transmitting antennas, at least one receiving device for radar signals, and one or more receiving antennas. The transmitting device is constructed such that it generates individual transmission signals for each transmitting antenna via OFDM, wherein only a subset of all available subcarriers is occupied in each transmitted signal. In this context, the subcarriers are assigned at the individual transmitting antennas according to a distribution scheme in which each subcarrier is assigned to one transmitting antenna only and the subcarriers assigned to each transmitting antenna are distributed across the entire signal bandwidth. The receiving device is designed such that it assignes the received radar signals to the transmitting antennas from which they were transmitted on the basis of the received subcarriers and the distribution scheme.

In a configuration of the radar system as a network, multiple transmitting devices each having one or more transmitting antennas are arranged on spatially separate platforms. The transmitting frequencies of the individual transmitting devices are synchronised either by highly precise clocks or via a shared (wireless or hard-wired) reference, so that the orthogonality of the subcarriers transmitted by the various transmitting devices is assured.

The suggested method and the associated radar system may be used particularly for MIMO radar applications and in sensor networks. The separation of user or transmitted signal is achieved by not transmitting the various subcarriers of a multicarrier signal on all transmitting antennas simultaneously, but instead by allocating the individual subcarriers exclusively to the various transmitting antennas according to a (any) scheme and using the entire signal bandwidth. In this way, the multicarrier signals are interlaced in the spectral range, and are at the same time orthogonal but still occupy the entire system bandwidth. In conjunction with a suitable processing method, for example the modulation symbol-based processing method described above, it is thus possible to achieve very high dynamics while retaining full orthogonality of the signal paths.

BRIEF DESCRIPTION OF THE DRAWING

In the following, the suggested method and the associated radar system will be explained briefly again with reference to an exemplary embodiment and in conjunction with the drawing. In the drawing:

FIG. 4 is an example of a permutation matrix for successive occupation of all subcarriers at a transmitting antenna.

WAYS TO IMPLEMENT THE INVENTION

Figure 1:
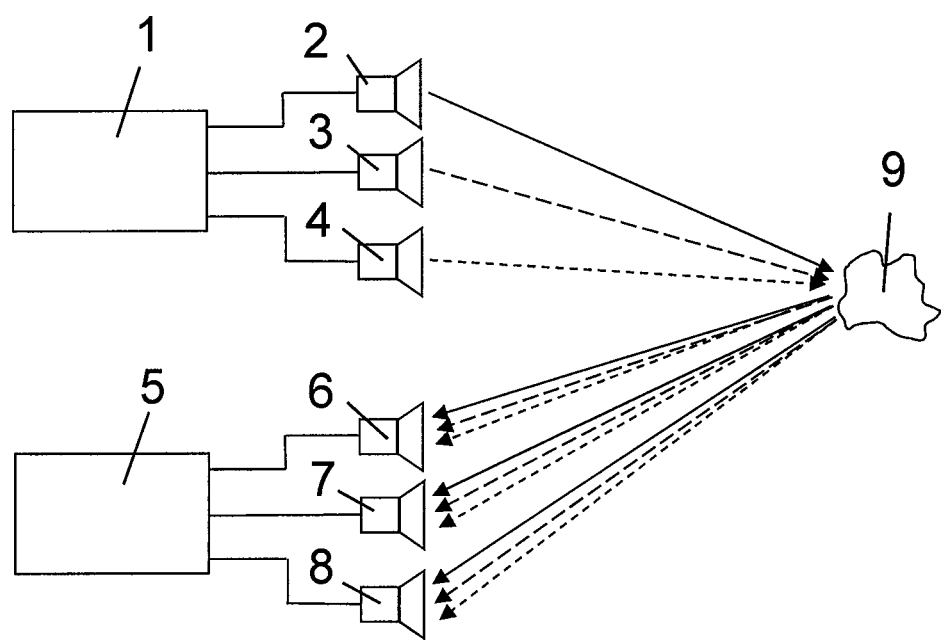
FIG. 1 is an exemplary configuration of a radar system according to the present invention.

FIG. 1 is an exemplary representation of a radar system comprising a transmitting device 1 with three transmitting antennas 2-4, which are supplied with individual signals for transmission by the transmitting device, and a receiving device 5 having three receiving antennas 6-8. The M=3 transmitting antennas and N=3 receiving antennas are used simultaneously. In this situation, it is initially unimportant whether they are located on a single platform (MIMO radar) or on different platforms (sensor network). In the present example, there are a total of 3×3=9 signal paths. The transmitted signals from M=3 different transmitters 2-4 are overlaid over each other at each receiver 6-8. Each receiver must determine the contributions (in amplitude and phase) of the individual transmitters from the received aggregate signal. With the suggested method and the associated radar system, this is achieved by dividing the transmitted signals among several subcarriers using OFDM, the subcarriers then being assigned to the transmitting antennas according to the distribution scheme described previously.

Figure 2:
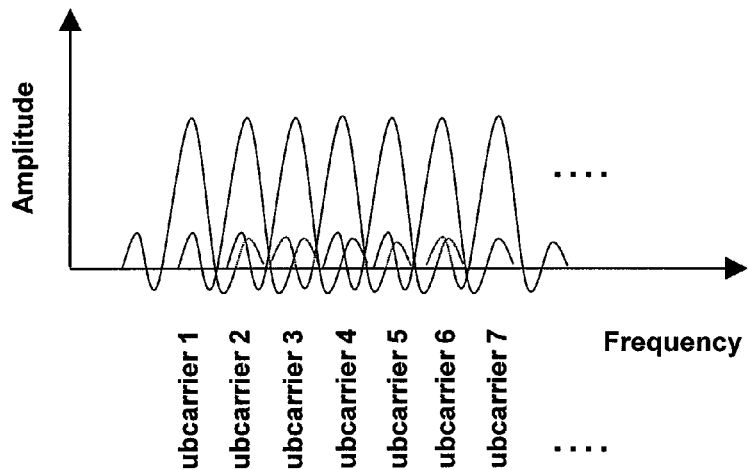
FIG. 2 is an example of a simplified OFDM spectrum.
Figure 3:
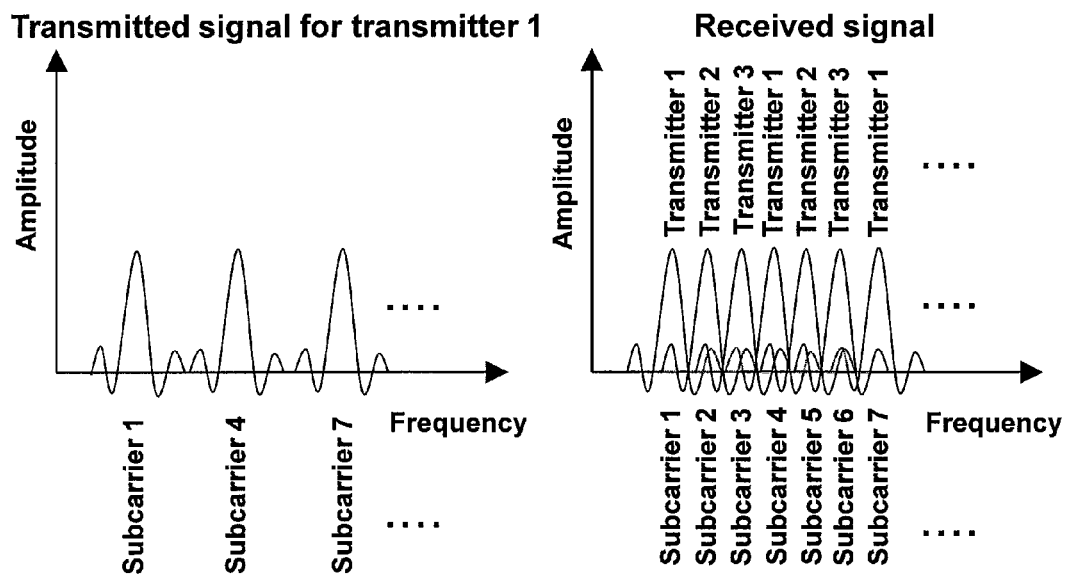
FIG. 3 is an example of a possible distribution scheme for generating orthogonally interlaced multicarrier signals.

FIG. 2 shows an abstracted OFDM spectrum resulting from the transmission of a large number of sinusoidal phase-modulated subcarriers. In the present method, the individual subcarriers are assigned exclusively to the various transmitting antennas according to a preset distribution scheme, and the subcarriers that are assigned to each transmitting antenna are spread across the entire signal bandwidth. The simplest possible distribution scheme for assigning the subcarriers is successively alternating assignment. In the exemplary case of three transmitting antennas, the first, fourth, seventh and so on subcarriers are transmitted at the first antenna, the second, fifth, eighth and so on at the second antenna, and the third, sixth, ninth and so on subcarrier at the third antenna. This is illustrated diagrammatically for the first transmitter and the first transmitting antenna in the left portion of FIG. 3. The overlaid signals are orthogonal at the receiver and at all receiving antennas. Each subcarrier received may be assigned directly to a transmitter, as is indicated diagrammatically in the right portion of FIG. 3, and is not affected by the other transmitters. Since OFDM systems routinely work with very large numbers of subcarriers, an assignment of this kind barely reduces the overall bandwidth of the individual transmitted signals at all.

With transmitted signal separation of this kind, it is possible to achieve very high dynamics and still retain complete orthogonality of the signal paths. Thus theoretical calculations on MIMO radar in which a typical code-based method according to the prior art was implemented showed anticipated dynamics in the order of 30 dB for the pulse response. In contrast, measurements with the modulation symbol-based method using the transmitted signal separation according to the invention show dynamics in the order of 65 dB. It may thus be possible to increase the dynamics of an MIMO radar measurement by about 35 dB, that is to say by a factor of 3000, with the method according to the invention. With regard to use in a sensor network, in which the individual transmitters are not phase-coherent, computer simulations showed that the suggested method might still enable an additional reduction in interference in the order of 20 dB.

In an advantageous configuration of the suggested method, and of the associated radar system, assignment of the individual subcarriers to the transmitting antennas undergoes cyclic permutation. In this way, it is ensured that each subcarrier has been transmitted by each antenna after a specified number of time steps. This prevents reduction of the maximum measurable distance when the modulation symbol-based method for distance determination is used. In this regard, FIG. 4 shows an example of a permutation matrix for the example described in the preceding with three transmitting antennas, with which this cyclic permutation may be realised. The numbers in the table indicate the assigned transmitter, each column corresponds to a distribution scheme, which changes with respect to the individual columns in fixed time steps.

LEGEND

1 Transmitting device
2, 3, 4 Transmitting antennas
5 Receiving device
6, 7, 8 Receiving antennas
9 Object

What is claimed is:

1. A method for separating transmitted signals in a radar system that includes multiple transmitting antennas with individual transmitted signals and one or several receiving antennas for radar signals, in which the radar signals are transmitted with a signal bandwidth via the individual transmitting antennas in such manner that received radar signals can be assigned to the transmitting antennas by which they were transmitted,
wherein the transmitted signals are shared among multiple subcarriers by means of OFDM, which subcarriers are assigned to the transmitting antennas according to a distribution scheme in which each subcarrier is assigned to one transmitting antenna only and in which the subcarriers assigned to each transmitting antenna are spread over the entire signal bandwidth.

2. The method according to claim 1,
wherein the distribution scheme is switched in fixed or variable periods.

3. The method according to claim 2,
wherein the distribution scheme is switched in such a manner that a cyclical permutation of the assignment of subcarriers to the transmitting antennas is achieved, so that each subcarrier has been transmitted by each transmitting antenna by the end of a fixed number of time steps.

4. The method according to claim 1,
wherein in the case of radar systems in which multiple transmitting devices are each located together with one or several transmitting antennas on separate platforms, transmitting frequencies of the individual transmitting devices are synchronised either by highly accurate clocks or by a common reference, so that the orthogonality of the subcarriers transmitted by the different transmitting devices can be assured.

5. A radar system comprising at least one transmitting device for radar signals, multiple transmitting antennas, at least one receiving device for radar signals, and one or several receiving antennas,
in which the transmitting device is designed in such manner that it transmits the radar signals with a signal bandwidth via the individual transmitting antennas in such manner that received radar signals can be assigned to the transmitting antennas by which they were transmitted in the receiving device,
wherein the transmitting device is designed such that it shares the transmitted signals among multiple subcarriers by means of OFDM, and assigns the subcarriers to the transmitting antennas according to a distribution scheme in which each subcarrier is assigned to one transmitting antenna only and in which the subcarriers assigned to each transmitting antenna are spread over the entire signal bandwidth, and that the receiving device is designed such that it assigns the received radar signals to the transmitting antennas by which they were transmitted on the basis of the subcarriers received and the distribution scheme.

6. The radar system according to claim 5,
wherein the transmitting device is designed in such manner that it changes the distribution scheme cyclically so that cyclical permutation of the assignment of the subcarriers to the transmitting antennas is achieved, such that each subcarrier has been transmitted by each transmitting antenna after a fixed number of time steps.

7. The radar system according to claim 5,
wherein multiple transmitting devices are each located together with one or more transmitting antennas on separate platforms, wherein transmitting frequencies of the individual transmitting devices are synchronised either by highly accurate clocks or by a common reference, so that the orthogonality of the subcarriers transmitted by the different transmitting devices can be assured.

8. The radar system according to claim 6,
wherein multiple transmitting devices are each located together with one or more transmitting antennas on separate platforms, wherein transmitting frequencies of the individual transmitting devices are synchronised either by highly accurate clocks or by a common reference, so that the orthogonality of the subcarriers transmitted by the different transmitting devices can be assured.

9. The method according to claim 3,
wherein in the case of radar systems in which multiple transmitting devices are each located together with one or several transmitting antennas on separate platforms, transmitting frequencies of the individual transmitting devices are synchronised either by highly accurate clocks or by a common reference, so that the orthogonality of the subcarriers transmitted by the different transmitting devices can be assured.

* * * * *